June 5, 1951 J. G. HACKNEY 2,555,441
LAWN EDGING CUTTER
Filed Sept. 30, 1947 2 Sheets-Sheet 1
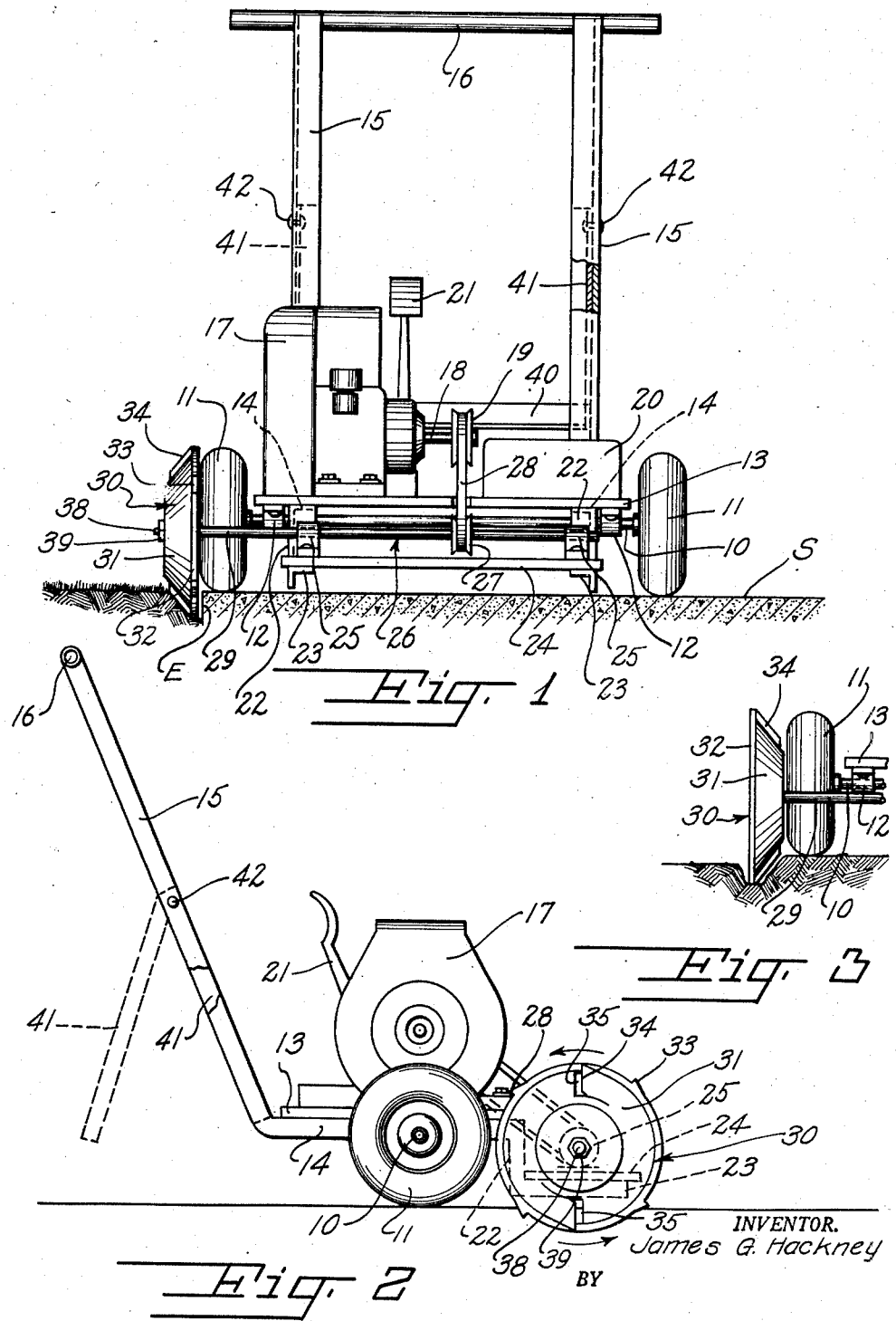
INVENTOR.
James G. Hackney
BY
McMorrow, Berman & Davidson
Attorneys

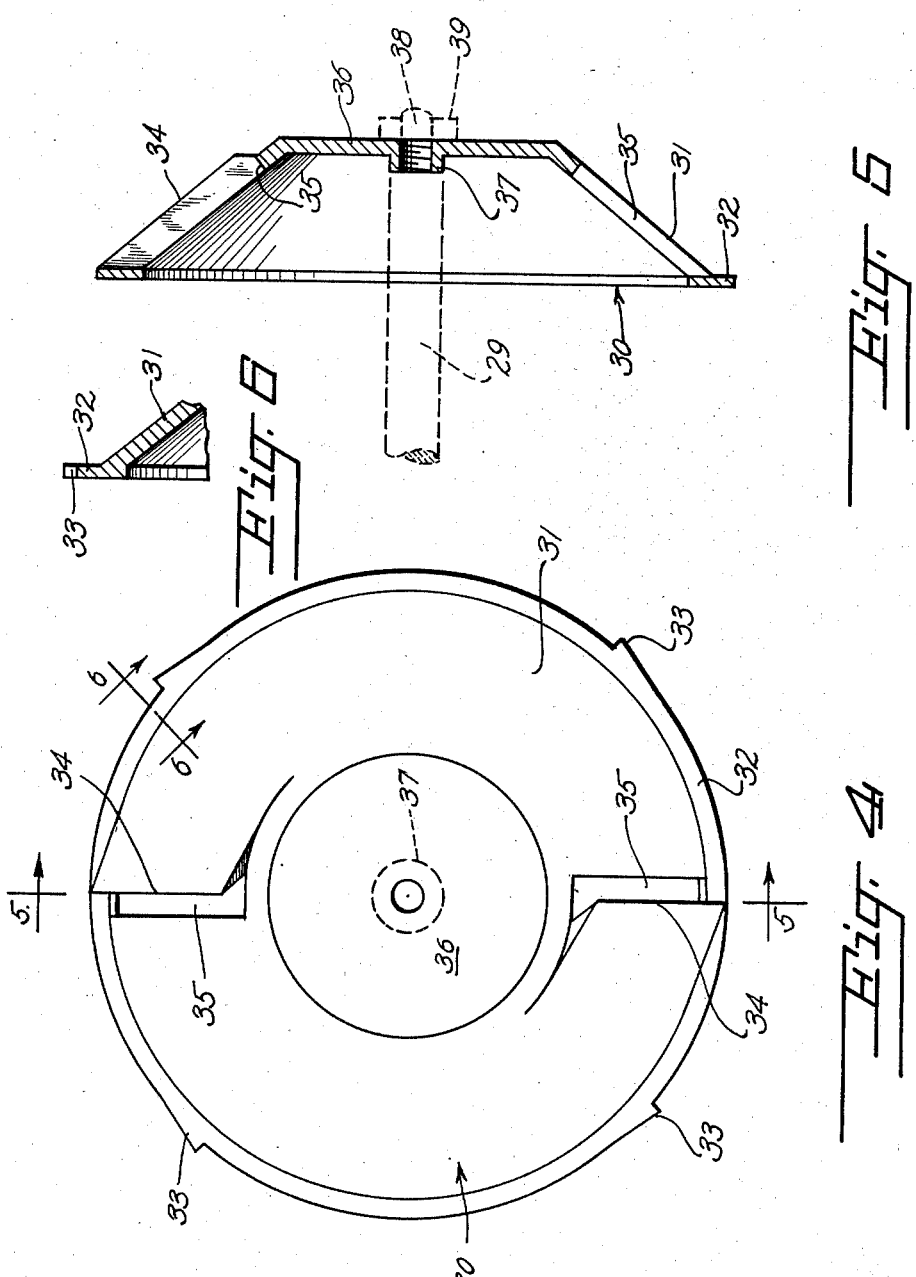

Patented June 5, 1951

2,555,441

UNITED STATES PATENT OFFICE 2,555,441

LAWN EDGING CUTTER

James G. Hackney, Fort Worth, Tex.

Application September 30, 1947, Serial No. 776,997

1 Claim. (Cl. 97—227)

This invention relates to a machine for trimming or edging lawns adjacent to sidewalks, curbings, flower beds, and the like.

An important object of the invention is to provide a power driven lawn edger which is easy to operate and simplified in construction.

A further object is to provide a machine of the above mentioned character which has means to control the depth to which the rotary edging cutter can penetrate into the ground.

A further object is to provide a machine of the above mentioned character, wherein the rotary cutting element is mounted close to ground, thus permitting the use of a cutter having a relative small diameter.

Other objects and advantages of the invention will be apparent during the course of the following description.

In the accompanying drawings, forming a part of this application, and in which like numerals are employed to designate like parts throughout the same, Figure 1 is a front elevation of the lawn edging machine embodying the invention, Figure 2 is a side elevation of the same, Figure 3 is a fragmentary front elevation of the machine showing the rotary cutter reversed, Figure 4 is an enlarged side elevation of the rotary cutter, Figure 5 is a central vertical section taken on line 5—5 of Figure 4, and, Figure 6 is a fragmentary radial section on line 6—6 of Figure 4.

In the drawings, where for the purpose of illustration is shown a preferred embodiment of the invention, the numeral 10 designates a horizontal rotatable axle or shaft, carrying rubber tired wheels 11, rigidly mounted upon opposite ends of the shaft, for rotation therewith. The shaft 10 is rotatably received in bearings 12, rigidly mounted upon the bottom surface of a horizontal flat plate or platform 13, near the opposite side edges of the same. The shaft 10 supports the platform 13, and the wheels 11 are adapted to roll upon the ground.

Rigidly connected to the under side of the platform 13, and disposed laterally inwardly of the bearings 12, are horizontal parallel longitudinal frame members 14. These frame members 14 extend from the front to the rear edges of the platform 13, and at the rear edge of the platform are bent upwardly for upwardly extending and rearwardly inclined parallel frame members 15, rigidly connected at their top ends by means of a horizontal cross bar or handle 16. The members 14 have openings to permit the passage of the rotatable shaft 10 therethrough.

Mounted upon the platform 13, and disposed directly above the axle 10 is a suitable engine 17, including a transverse horizontal crank shaft extension 18, upon which is mounted a grooved pulley 19, for rotation therewith. The engine 17 is arranged near one side of the platform 13, and the pulley 19 is disposed above the platform, at the transverse center of the same. A gas tank 20 may be mounted upon the opposite side of the platform 13, as shown. A foot lever 21 is provided, and serves as a crank for starting the engine 17.

Adjacent to the front edge of the platform 13, the frame members 14 carry vertical depending extensions or arms 22, carrying horizontal parallel forwardly projecting arms or runners 23, preferably integral therewith. Suitably rigidly mounted upon the runners 23, and extending laterally of the machine at its forward end is a flat horizontal plate or support 24. Rigidly mounted upon the top surface of the plate 24 are spaced bearings 25, rotatably receiving a transverse horizontal shaft 26. Mounted upon this shaft 26 for rotation therewith, and disposed beneath the pulley 19 is a grooved pulley 27. A V-belt 28 engages over the pulleys 27 and 19, for driving the shaft 26. The shaft 26 is held against axial displacement, by any suitable means, and includes a lateral extension 29 at one end thereof, which extends laterally outwardly beyond the adjacent wheel 11. Mounted upon the outer end of the shaft extension 29, for rotation therewith is a lawn edger or rotary cutter 30.

The cutter 30 comprises a circular cone shaped disc 31, provided with an outer annular flange 32, disposed vertically in Figure 1. This flange 32 carries a plurality of circumferentially spaced teeth or cutting elements 33, integral therewith, and projecting radially therefrom. The cone shaped disc 31 is provided with diametrically oppositely disposed inclined cutter blades 34, preferably formed integral with the disc. The forward cutting edges of the blades 34 face in opposite directions, Figure 4, so as to cut simultaneously, when the cutter rotates counterclockwise in Figures 2 and 4. The blades 34 extend for substantially the entire inclined width of the cone shaped disc 31. The cutting edges of the blades 34 project radially outwardly from the disc 31 to a point near the outside diameter of the flange 32, Figure 5. Slots 35 are provided in the disc 31, adjacent to the blades 34, and these slots extend for the entire lengths of the blades. The cutter further comprises a vertical circular side disc 36, carrying a central boss or hub 37, which is internally screw-threaded to receive the outer screw threaded extension 38 of the shaft extension 29. A nut 39 is employed to secure the cutter 30 onto the shaft extension 29. The cutter 30 is open at its side adjacent to the flange 32. As clearly shown in Figures 1 and 3, respectively, the cutter 30 is reversible, and the vertical annular flange 32 may be disposed inwardly or outwardly, as desired. The cuttings pass through the slots 35 and are discharged from the open side of the cutter.

Hingedly connected to the inclined frame members 15 near their longitudinal center points is a U-shaped rest or prop, including a bottom horizontal transverse member 40, rigidly connected at its opposite ends to upstanding sides or members 41. The members 41 are pivotally connected near their top ends to the members 15, as at 42. The U-shaped prop is normally stowed between the members 15, but may be swung rearwardly to a position like that shown in broken lines in Figure 2. In this position, while the machine is at rest, the U-shaped prop may engage the ground so the machine cannot pivot over backwards.

In use, the rotary cutter 30 may be mounted upon the shaft in the position shown in Figure 1. The wheels 11 are shown rolling upon a sidewalk S, or the like, having a vertical edge E. The vertical annular flange 32 is disposed close to the edge E, as shown. The U-shaped prop, including the sides 41 may be swung rearwardly to engage the ground, and the engine 17 started by depressing the foot lever 21. The U-shaped prop may then be swung to the closed or stowed position. The shaft extension 18 is now rotating, driving the pulley 19, belt 28, pulley 27, shaft 26, and cutter 30. The cutter 30 rotates in the direction indicated in Figure 2. The blades 34 and teeth 33 will now edge or cut the sod adjacent to the walk edge E, and form a furrow having an inclined side adjacent to the walk, as the machine is pushed forwardly by the user. The depth of the furrow which the rotary cutter will cut is regulated by the runners 23, which will engage the ground when the cutter tends to cut too deeply. The disposition of the shaft 26 close to the ground level permits the use of a rotary cutter having a relatively small diameter. The cutter may be mounted as shown in Figure 3, with the flange 32 outermost, for edging flower beds, and the like. Since the engine 17 is disposed directly over the axle 10, the balance of the machine is excellent, and it is easy to manipulate.

It is to be understood that the form of the invention herewith shown and described, is to be taken as a preferred example of the same, and that various changes in the shape, size and arrangement of parts may be resorted to, without departing from the spirit of the invention, or the scope of the subjoined claim.

Having thus described the invention, what I claim is:

In a machine for edging lawns having a substantially horizontal driven shaft, a hollow unitary metal cutter including a frusto-conical disc, at least two cutting blades formed integrally thereon and extending radially outwardly thereof, and having oppositely facing cutting edges, the metal forming the blades being struck out of the disc and providing a slot extending through the disc in advance of each of said two cutting blades, an integral peripheral flange on the larger end of said frusto-conical disc and a plurality of widely spaced integral teeth on said flange projecting radially therefrom.

JAMES G. HACKNEY.

REFERENCES CITED

The following references are of record in the file of this patent:

UNITED STATES PATENTS

| Number | Name | Date |
| --- | --- | --- |
| 184,446 | Treibal | Nov. 14, 1876 |
| 773,095 | Olson | Oct. 25, 1904 |
| 1,313,710 | McKoy | Aug. 19, 1919 |
| 2,034,505 | Cline | Mar. 17, 1936 |
| 2,088,534 | Pittman | July 27, 1937 |
| 2,432,922 | Muzzy | Dec. 16, 1947 |